INVENTORS:
E. M. Carmichiel
John P. Stein
BY
ATTORNEY

Patented Jan. 5, 1943

2,307,388

UNITED STATES PATENT OFFICE 2,307,388

SUSPENSION ASSEMBLY FOR TANDEM AXLE TRUCKS

Edward M. Carmichiel and John P. Stein, Seattle, Wash.; said Carmichiel assignor to Robert B. Lytel, Seattle, Wash.

Application November 16, 1939, Serial No. 304,672

5 Claims. (Cl. 280—124)

This invention relates to tandem-axle trucks and especially to the suspension of the axles therefor. The general object is to engineer a pair of companion torque-transfer or equalizing beams into the axle assembly of multi-wheel vehicles in a manner to resist axle torque more effectively than has heretofore been possible and, further, to provide an advanced hook-up of twin compensating beams in a manner to transmit reactive stresses, whether of driving or braking origin, without hampering flexibility of the unit. In furtherance of the latter aim, it is a particular object of the invention to devise improved hangers for suspending the axles from the ends of the compensating beams and which, through wrist movement, permit individual springing of the axle ends.

In accomplishing said ends, the invention consists in complementary equalizing beams at each side of the vehicle extending horizontally between the tadem axles with one beam lying above and the other below the horizontal plane of the axles, each beam, at its approximate mid-length, finding a journal mounting relative to the frame and, at the ends, providing a wrist connection with the axle ends. Still more especially, the invention consists in the novel construction and in the adaptation and combination of parts hereinafter described and claimed.

Figure 1:
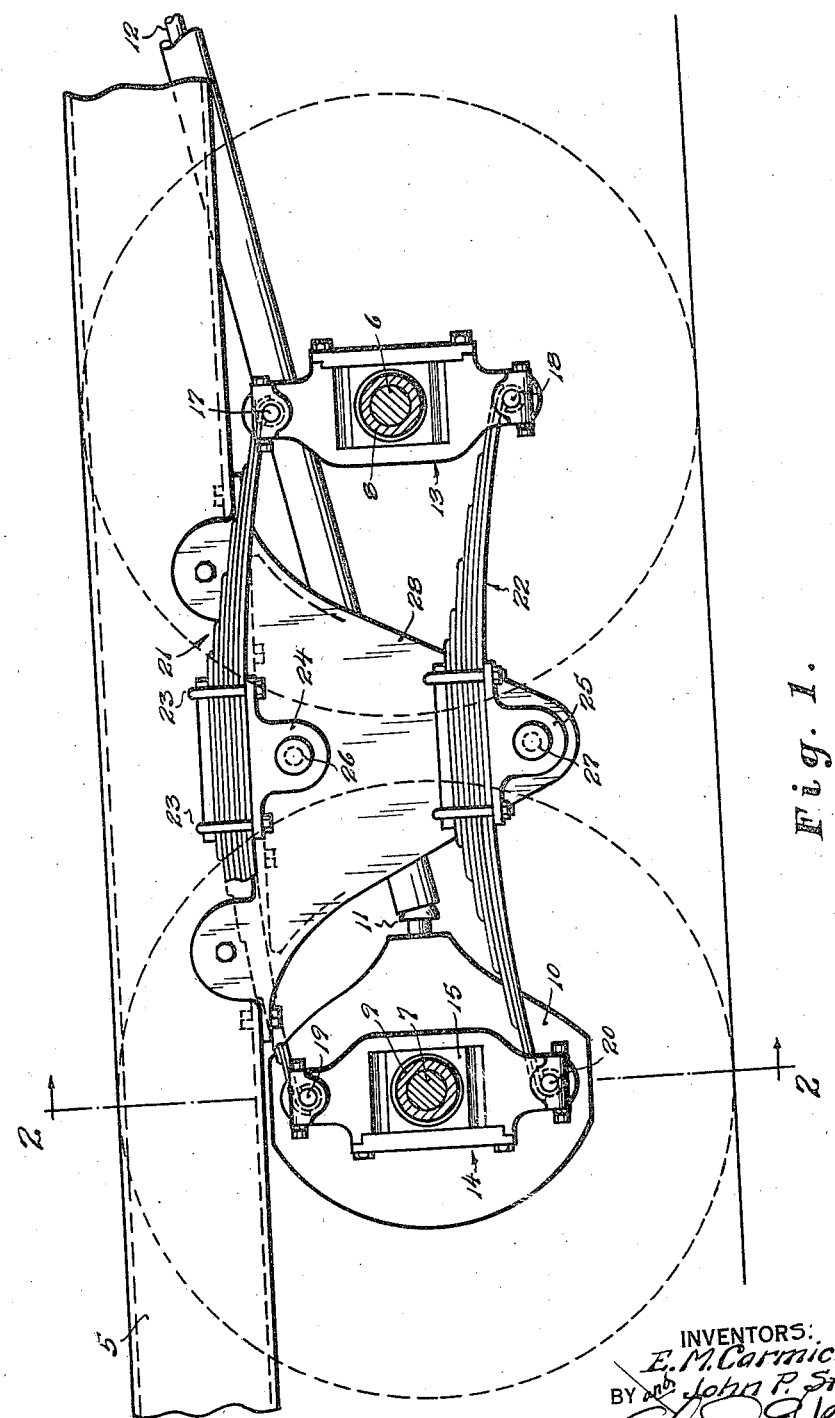
Figure 1 is a longitudinal vertical section taken exteriorly of the frame through the axles of a multi-wheel vehicle to represent, in elevation, a suspension arrangement according to the present invention.
Figure 2:
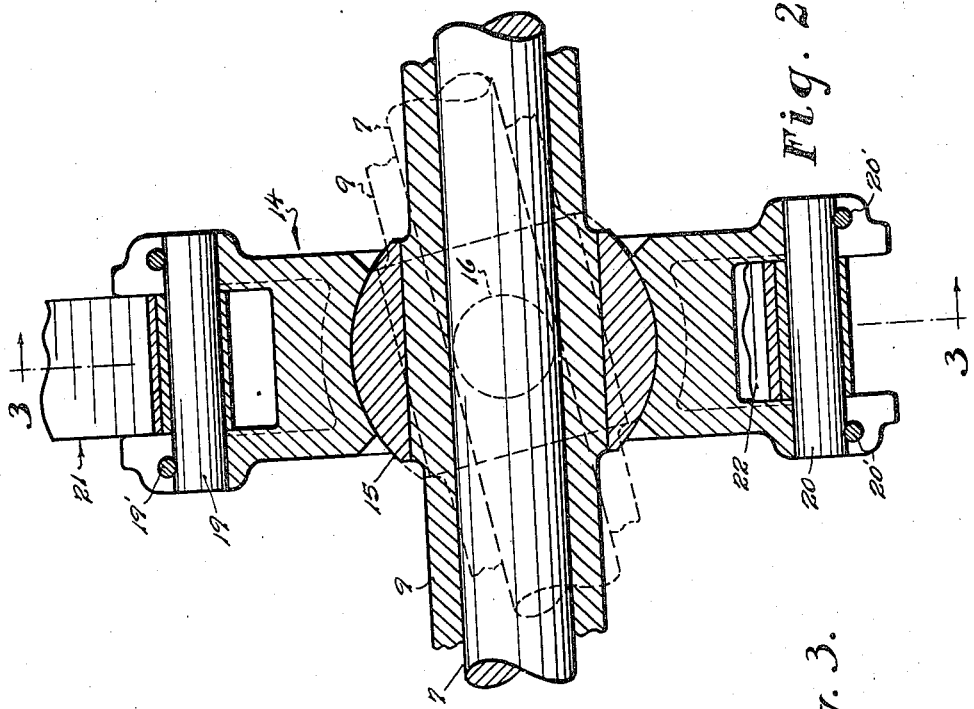
Fig. 2 is a fragmentary transverse vertical section taken to an enlarged scale on line 2—2 of Fig. 1.
Figure 3:
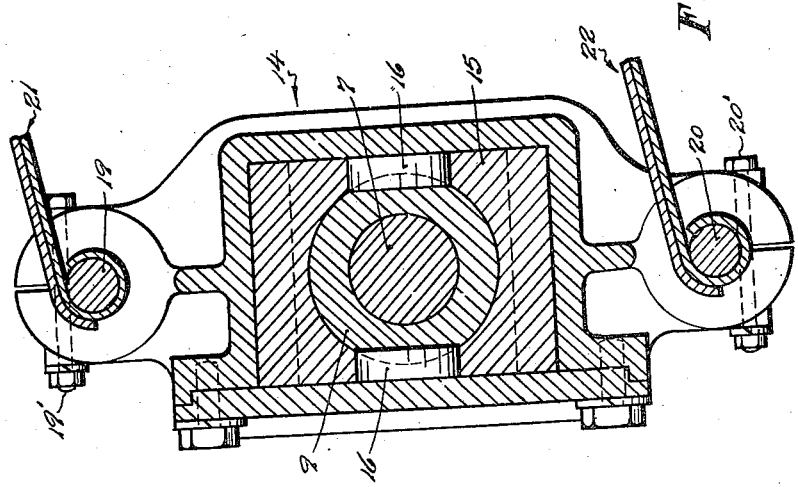
Fig. 3 is a fragmentary longitudinal vertical section on line 3—3 of Fig. 2.

Referring to the drawings—representing fragmentarily the chassis of a multi-wheel vehicle—the side girders of the main frame are denoted by the numeral 5 and the forward and rear tandem axles by 6 and 7, the forward axle which is a free axle being carried in a housing 8 and the rear axle, which operates as the driving or live axle, being carried in a housing 9 to the drive of a differential unit. The differential housing is indicated at 10 and a canted propeller shaft which connects by a universal 11 with said differential gearing is represented by 12.

Functioning to suspend the ends of said axles exteriorly of the vehicle frame are box hangers, indicated generally by 13 and 14, characterized in that the axle housings are given wrist movement in relation thereto through the instrumentality of blocks 15 journaled within the box openings of the hangers, the blocks being center-bored to receive the axle housings and being locked to the latter by dowels or the like 16, the wrist movement being one in which the axles are deflectible in their respective vertical planes about horizontal axes traversing the end blocks. Each box hanger, above and below the box openings, are prolonged by laterally spaced ears and through these ears are passed knuckle pins, the pins of the hanger 13 being denoted by 17—18 and those of the hanger 14 by 19—20.

Extending between the two hangers and at its two ends finding pivotal engagement with the knuckle pins 17 and 19 is a multiple-leaf spring 21, and below this spring 21 is a paralleling multiple-leaf spring 22 which at its two ends finds pivotal engagement with the knuckle pins 18 and 20. Each of these springs, at its substantial mid-length, is clamped by U-bolts 23 to a respective rocker bed, as 24 and 25, and supporting the rocker beds are perpendicularly aligned trunnion rods 26 and 27 journaled in a frame-carried bracket 28. The location of the trunnion rods is desirably such that, normally, the same lie in or proximate to a horizontal plane traversing the related knuckle pins whereby to preclude possibility of cramping even under utmost conditions of reactive stress. It is also desirable that the lower of the two trunnion rods be a through-rod, which is to say a rod extending transversely of the vehicle frame from one to the other suspension assembly, whereas the upper trunnion is of stud form and independent of the corresponding co-axial trunnion at the opposite side of the vehicle.

It will, it is believed, be apparent that we have engineered a suspension assembly for tandem-axle trucks devoid of any tendency to dampen flexure of the spring beams 21 and 22 in the course of transmitting torque stresses. Excepting, however, for such structural restrictions as are essential to a realization of this and the other objects in view, restrictions which are necessarily brought into the hereto annexed claims to distinguish from the prior state of the art, it is not our intention to limit our invention by any detail in the illustration of our preferred embodiment or by reference thereto in the description.

What we claim, is:

1. In a tandem rear axle vehicle, in combination with the tandem rear axles, housings receiving said axles for revoluble movement therein, and the vehicle main frame: suspension mechanism at each side of the vehicle comprising a pair of vertically spaced and longitudinally extending stress beams respectively fulcrumed between their ends to the frame for rocker movement about a transverse horizontal axis; hangers for the axle housings positioned in the vertical plane of the stress beams and providing means at the upper and lower ends functioning to engage the ends of the stress beams, said hangers being of box construction providing a central chamber extending in a transverse direction through the same and said chamber being characterized in that the ceiling and floor surfaces define cylinder segments produced about a common horizontal axis traversing the related axle at right angles to the latter; center-bored blocks receiving the axle housings therethrough and themselves finding a wrist bearing in the cylinders of the hangers, said blocks being provided with longitudinal bores in the opposite side walls; and removable dowels fitting in said side-wall bores and having functional connection with the axle housings for locking the housings against axial movement in relation to the related blocks.

2. In a tandem rear axle vehicle, in combination with the tandem rear axles, housings receiving said axles for revoluble movement therein, and the vehicle main frame: suspension mechanism at each side of the vehicle comprising a pair of vertically spaced and longitudinally extending stress beams respectively fulcrumed between their ends to the frame for rocker movement about a transverse horizontal axis; hangers for the axle housings extending between and connected for knuckle movement to the related ends of the stress beams, said hangers being of box construction providing a central chamber extending in a transverse direction through the same and said chamber being characterized in that the ceiling and floor surfaces complement one another to define a wrist bearing produced about a horizontal axis paralleling, or approximately paralleling, the longitudinal median line of the vehicle; and block elements functionally fixed against relative axial movement to the axle housings and received for wrist movement in said wrist bearings of the hangers.

3. In a vehicle, in combination with the rear axle, an axle housing receiving said axle for revoluble movement therein, and the vehicle main frame: suspension mechanism at each side of the vehicle comprising a pair of vertically spaced and longitudinally extending stress beams independently fulcrumed to the frame for rocker movement about transverse horizontal axes; a hanger for the axle housing extending between and connected for knuckle movement to the free ends of the stress beams and, between said connections, providing a chamber extending in a transverse direction through the hanger and having its ceiling and floor surfaces acting in complement to produce a cylindrical wrist bearing described about a horizontal axis paralleling, or approximately paralleling, the longitudinal median line of the vehicle; and a block element receiving the axle housing therethrough, having said axle housing fixed against axial movement in relation thereto, and itself finding a wrist bearing in said chamber of the hanger.

4. An axle suspension according to claim 3, said fixing of the axle housing to the block element being provided by removable dowels carried by the latter and functionally engaging the former.

5. In vehicle construction, in combination with a vehicle axle, a housing therefor, and a vehicle main frame: a frame-supported hanger presenting a chamber open at the front and sides only and having its ceiling and floor surfaces defining cylinder segments produced about a common horizontal axis paralleling, or approximately paralleling, the longitudinal median line of the vehicle; a block finding a wrist bearing in the cylinder of the hanger, transversely center-bored for the reception of the axle housing, and having the walls at each side of said center-bore through-bored on an axis coinciding with that of the cylinder segments; removable stub-dowels fitting in said last-named wall bores to lie at opposite sides of the axle housing and functionally engaging said housing for locking the latter against axial movement in relation to the block; and a removable closure plate forming a front wall for the block-receiving chamber for securing said block within the hanger.

JOHN P. STEIN.
EDWARD M. CARMICHIEL.